United States Patent
Carasso et al.

(10) Patent No.: US 8,751,963 B1
(45) Date of Patent: Jun. 10, 2014

(54) REAL TIME INDICATION OF PREVIOUSLY EXTRACTED DATA FIELDS FOR REGULAR EXPRESSIONS

(71) Applicant: Splunk Inc., San Francisco, CA (US)

(72) Inventors: R. David Carasso, San Rafael, CA (US); Micah James Delfino, San Francisco, CA (US); Johnvey Hwang, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 13/748,391

(22) Filed: Jan. 23, 2013

(51) Int. Cl.
*G06F 3/048* (2013.01)
*G06F 3/0481* (2013.01)
*G06F 9/44* (2006.01)
*G06F 3/0482* (2013.01)

(52) U.S. Cl.
CPC ............ *G06F 3/0481* (2013.01); *G06F 9/4443* (2013.01); *G06F 3/0482* (2013.01)
USPC ............ 715/823; 715/808; 715/821; 715/826

(58) Field of Classification Search
USPC .................................. 715/823, 808, 821, 826
See application file for complete search history.

(56) References Cited

U.S. PATENT DOCUMENTS

| | | | |
|---|---|---|---|
| 6,049,777 A | 4/2000 | Sheena et al. | |
| 6,112,186 A | 8/2000 | Bergh et al. | |
| 6,374,251 B1 | 4/2002 | Fayyad et al. | |
| 6,954,756 B2 | 10/2005 | Arning et al. | |
| 7,389,306 B2 | 6/2008 | Schuetze et al. | |
| 7,644,414 B2 * | 1/2010 | Smith et al. | 719/328 |
| 7,650,512 B2 * | 1/2010 | Karimisetty et al. | 713/193 |
| 7,805,482 B2 | 9/2010 | Schiefer | |
| 7,958,164 B2 * | 6/2011 | Ivanov et al. | 707/805 |
| 8,022,987 B2 * | 9/2011 | Ko et al. | 348/143 |
| 8,121,973 B2 | 2/2012 | Anderson et al. | |
| 8,442,950 B2 * | 5/2013 | D'Souza et al. | 707/665 |
| 8,458,612 B2 * | 6/2013 | Chatterjee et al. | 715/779 |
| 2002/0049740 A1 | 4/2002 | Arning et al. | |
| 2002/0133513 A1 | 9/2002 | Townsend et al. | |
| 2003/0061212 A1 | 3/2003 | Smith et al. | |
| 2004/0010497 A1 | 1/2004 | Bradley et al. | |

(Continued)

OTHER PUBLICATIONS

"iTunes for Mac: Create a Smart Paylist," Apple, Nov. 27, 2012 http://support.apple.com/kb/PH1739?viewlocale=en_US.

(Continued)

*Primary Examiner* — David Phantana Angkool
(74) *Attorney, Agent, or Firm* — Hickman Palermo Truong Becker Bingham Wong LLP; Kirk D. Wong

(57) ABSTRACT

Embodiments are directed towards real time display of event records with an indication of previously provided extraction rules. A plurality of extraction rules may be provided to the system, such as automatically generated and/or user created extraction rules. These extraction rules may include regular expressions. A plurality of event records may be displayed to the user, such that text in a field defined by an extraction rule is emphasized in the display of the event record. The same emphasis may be provided for text in overlapping fields, or the emphasis may be somewhat different for different fields. The user interface may enable a user to select a portion of text of an event record, such as by rolling-over or clicking on an emphasized part of the event record. By selecting the portion of the event record, the interface may display each extraction rule associated with the selected portion.

30 Claims, 15 Drawing Sheets

(56) References Cited

U.S. PATENT DOCUMENTS

| | | | |
|---|---|---|---|
| 2004/0148154 | A1 | 7/2004 | Acero et al. |
| 2004/0148170 | A1 | 7/2004 | Acero et al. |
| 2005/0065967 | A1 | 3/2005 | Schuetze et al. |
| 2005/0235356 | A1 | 10/2005 | Wang |
| 2006/0053174 | A1 | 3/2006 | Gardner et al. |
| 2006/0112123 | A1 | 5/2006 | Clark et al. |
| 2006/0161564 | A1 | 7/2006 | Pierre et al. |
| 2006/0173917 | A1 | 8/2006 | Kalmick et al. |
| 2006/0259519 | A1 | 11/2006 | Yakushev et al. |
| 2006/0265397 | A1 | 11/2006 | Bryan et al. |
| 2007/0003146 | A1* | 1/2007 | Ko et al. ............ 382/224 |
| 2007/0239694 | A1 | 10/2007 | Singh et al. |
| 2008/0301095 | A1 | 12/2008 | Zhu et al. |
| 2008/0306980 | A1 | 12/2008 | Brunner et al. |
| 2008/0320033 | A1 | 12/2008 | Koistinen et al. |
| 2009/0094207 | A1 | 4/2009 | Marvit et al. |
| 2009/0177689 | A1 | 7/2009 | Song et al. |
| 2009/0287628 | A1 | 11/2009 | Indeck et al. |
| 2009/0287680 | A1 | 11/2009 | Paek et al. |
| 2010/0017390 | A1* | 1/2010 | Yamasaki et al. ............ 707/5 |
| 2010/0106743 | A1 | 4/2010 | Brunner et al. |
| 2010/0138377 | A1 | 6/2010 | Wright et al. |
| 2010/0223499 | A1 | 9/2010 | Panigrahy et al. |
| 2011/0010685 | A1 | 1/2011 | Sureka et al. |
| 2011/0040724 | A1 | 2/2011 | Dircz |
| 2011/0219035 | A1 | 9/2011 | Korsunsky et al. |
| 2011/0231223 | A1 | 9/2011 | Winters |
| 2011/0276695 | A1 | 11/2011 | Maldaner |
| 2011/0320450 | A1 | 12/2011 | Liu et al. |
| 2012/0089562 | A1 | 4/2012 | Deremigio et al. |
| 2012/0101975 | A1 | 4/2012 | Khosravy |
| 2012/0117079 | A1 | 5/2012 | Baum et al. |
| 2012/0221559 | A1 | 8/2012 | Kidron |
| 2012/0226779 | A1 | 9/2012 | Crucs |
| 2012/0311467 | A1 | 12/2012 | Bijani et al. |
| 2013/0019019 | A1 | 1/2013 | Lam |
| 2013/0054660 | A1 | 2/2013 | Zhang |
| 2013/0060937 | A1 | 3/2013 | Bath et al. |
| 2013/0073542 | A1 | 3/2013 | Zhang et al. |
| 2013/0080190 | A1* | 3/2013 | Mansour et al. ............ 705/3 |
| 2013/0080641 | A1 | 3/2013 | Lui et al. |
| 2013/0173322 | A1 | 7/2013 | Gray |
| 2013/0182700 | A1 | 7/2013 | Figura et al. |

OTHER PUBLICATIONS

"RegexBuddy Demo—Self-Running Demonstration," RegexBuddy.com, Oct. 28, 2012 http://www.regexbuddy.com/democreate.html.

Carasso, D., "Exploring Splunk: Search Processing Language (SPL) Primer and Cookbook," Splunk, Apr. 2012.

Carasso, D., "Semi-Automatic Discovety of Extraction Patterns for Log Analysis," 2007.

Riloff, E. et al., "Learning Dictionaries for Information Extraction by Multi-Level Bootstrapping," Proceedings of the Sixteenth National Conference on Artificial Intelligence, Jul. 1999.

Soderland, S. et al., "Issues in inductive Learning of Domain-Specific Text Extraction Rules," Proceedings of the Workshop on New Approaches to Learning for Natural Language Processing at the Fourteenth International Joint Conference on Artificial Intelligence, Aug. 1995.

Final Office Action of Oct. 1, 2013 for U.S. Appl. No. 13/748,306, 19 pages.

Final Office Action of Sep. 26, 2013 for U.S. Appl. No. 13/748,313, 13 pages.

Final Office Action of Sep. 13, 2013 for U.S. Appl. No. 13/747,177, 17 pages.

Final Office Action of Sep. 16, 2013 for U.S. Appl. No. 13/748,360, 19 pages.

Non-Final Office Action of May 16, 2013 for U.S. Appl. No. 13/748,306, 16 pages.

Non-Final Office Action of Jun. 5, 2013 for U.S. Appl. No. 13/748,313, 22 pages.

Non-Final Office Action of May 2, 2013 for U.S. Appl. No. 13/748,360, 17 pages.

Non-Final Office Action of Apr. 30, 2013 for U.S. Appl. No. 13/747,177, 18 pages.

Non-Final Office Action of May 22, 2013 for U.S. Appl. No. 13/747,153, 26 pages.

Hanghang Tong et al., "Fast mining of complex time-stamped events" Proceeding CIKM '08 Proceedings of the 17th ACM conference on Information and knowledge management, Oct. 26-30, 2008, (pp. 759-768).

Kalmanek et al., "Darkstar: Using exploratory data mining to raise the bar on network reliability and performance" 2009—IEEE (pp. 1-10).

Notice of Allowance of Nov. 26 2013 for U.S. Appl. No. 13/747,153, 23 pages.

* cited by examiner

Extract Fields
Specify your data source, then highlight the text you would like to extract.

Specify your data source
Sourcetype | syslog

Extraction Rule Preview
When you select text, we will give you a preview of the extraction rule you have created. Or you can manually enter and/or edit an extraction rule by clicking the button below.

*Create extraction rule*

☐ Dim fields that are already extracted.

Filter: [ ]    Show: All    Result type: Latest

*Save this extraction*

| Timestamp | Event Records |
|---|---|
| 2012-12-17 10:35:38-0800 | Dec 17 10:35:38 ronnie nslcd[23629]: [40f750] passwd entry uid-colwilliams.cn=users.dc=osx.dc=splat.dc=coms contains too large uidNumber value |
| 2012-12-17 10:35:38-0800 | Dec 17 10:35:38 ronnie nslcd[23629]: [40f750] passwd entry uid-mpideon.cn=users.dc=osx.dc=splat.dc=coms contains too large uidNumber value |
| 2012-12-17 10:58:59-0800 | Dec 17 10:58:59 ronnie sshd[23362]: subsystem request for sftp |
| ... | |

Extracted values

⇨ *To begin, highlight an example value from the events to the left*

*FIG. 8A*

Extract Fields

Specify your data source, then highlight the text you would like to extract.

Specify your data source

[Sourcetype ▼]   [syslog ▼]

Extraction Rule Preview    Field name

812 [[^\\n*\\]\\s+(?P<FIELDNAME>\\w+)]    [FIELDNAME] 814

☐ Dim fields that are already extracted.

Filter: [          ]    Show: [All ▼]    Result type: [Latest ▼]

| Timestamp | Event Records |
|---|---|
| 2012-12-17<br>10:35:38-0800 | Dec 17 10:35:38 ronnie nslcd[23629]: [40f750] passwd entry uid-<br>colwilliams.cn=users.dc=osx.dc=splat.dc=coms contains too large<br>uidNumber value |
| 2012-12-17<br>10:35:38-0800 | Dec 17 10:35:38 ronnie nslcd[23629]: [40f750] passwd entry uid-<br>mpideon.cn=users.dc=osx.dc=splat.dc=coms contains too large<br>uidNumber value |
| 2012-12-17<br>10:58:59-0800 | Dec 17 10:58:59 ronnie sshd[23362]: subsystem request for sftp |
| ... | |

822  824

( Save this extraction )

Extracted values

*Passwd*  ▇▇▇▇ 40%

*subsystem* ▇ 10%

*logfile* ▏ 2%

Extract Fields

Specify your data source, then highlight the text you would like to extract.

Specify your data source

| Sourcetype | syslog |

Extraction Rule Preview

When you select text, we will give you a preview of the extraction rule you have created. Or you can manually enter and/or edit an extraction rule by clicking the button below.

(Create extraction rule)

826 — ☒ Dim fields that are already extracted.

Filter: [        ]   Show: [All ▼]   Result type: [Latest ▼]

| Timestamp | Event Records |
|---|---|
| 2012-12-17 10:35:38-0800 | Dec 17 10:35:38 ronnie nslcd[23629]: [40f750] passwd entry uid- colwilliams,cn=users,dc=osx,dc=splat,dc=coms contains too large uidNumber value |
| 2012-12-17 10:35:38-0800 | Dec 17 10:35:38 ronnie nslcd[23629]: [40f750] passwd entry uid- mpideon,cn=users,dc=osx,dc=splat,dc=coms contains too large uidNumber value |
| 2012-12-17 10:58:59-0800 | Dec 17 10:58:59 ronnie sshd[23362]: subsystem request for sftp |

828    830

Extracted values

⇩ Roll over highlighted text to see previously saved extraction rules

| Timestamp | Event Records |
|---|---|
| 2012-12-17 10:35:38-0800 | Dec 17 10:35:38 ronnie nslcd[23629]: [40f750] passwd entry uid-colwilliams.cn=users.dc=osx.dc=splat.dc=coms contains too large uidNumber value |
| 2012-12-17 10:35:38-0800 | Dec 17 10:35:38 ronnie nslcd[23629]: [40f750] passwd entry uid-mpideon.cn=users.dc=osx.dc=splat.dc=coms contains too large uidNumber value |
| 2012-12-17 10:58:59-0800 | Dec 17 10:58:59 ronnie sshd[23362]: subsystem request for sftp |
| ... | |

Extracted values

| Fieldname | Value |
|---|---|
| Server ID | 23629 |

*Roll over highlighted text to see previously saved extraction rules*

FIG. 9B

| Timestamp | Event Records |
|---|---|
| 2012-12-17 10:35:38-0800 | Dec 17 10:35:38 ronnie nslcd[23629]: [40f750] passwd entry uid-colwilliams.cn=users.dc=osx.dc=splat.dc=coms contains too large uidNumber value |
| 2012-12-17 10:35:38-0800 | Dec 17 10:35:38 ronnie nslcd[23629]: [40f750] passwd entry uid-mpideon.cn=users.dc=osx.dc=splat.dc=coms contains too large uidNumber value |
| 2012-12-17 10:58:59-0800 | Dec 17 10:58:59 ronnie sshd[23362]: subsystem request for sftp |
| ... | |

Extracted values

| Fieldname | Value |
|---|---|
| Error | passwd entry uid-colwilliams.cn=users.dc=osx.dc=splat.dc=coms |
| Error type | passwd |
| User ID | colwilliams |

*Roll over highlighted text to see ction*

```
                                                                              1000A for (var i = 0; i < field_extractions.length; i++) {
            var curr = field_extractions[i];

if (curr.start >= extractionStart && curr.start < extractionEnd){ //is curr.start
inside the extraction? (we are starting in the extraction)
                if (start_point < extractionStart){ // would indicate there is a prev range that
hasn't been pushed yet
                    wrappers.push({start:start_point, end:end_point,
fields:fields_contained});
                    fields_contained = []; //start a new empty fields_contained array
                }
                start_point = extractionEnd;
                if(curr.end > extractionEnd) { // does the current field extend past the end
of the extraction?
                    end_point = curr.end;
                    fields_contained.push({name:curr.name,value:curr.value}); // add it to
the array of fields contained within the overall chunk we're building
                } else {
                    end_point = extractionEnd;
                }
            } else {
                if (curr.start < extractionStart){ // current field starts before the extraction
                    if (curr.end > extractionStart ){ // current field ends inside or after the
extraction
                        if(curr.start < end_point){ // still inside previous range
                            end_point = extractionStart; // make the end of the range the start of
the extraction (never end in an extraction)
                            fields_contained.push({name:curr.name,value:curr.value}); // add
it to the array of fields contained within the overall chunk we're building
                        } else { // no longer in the previous range
                            wrappers.push({start:start_point, end:end_point,
fields:fields_contained}); // push previous range
                            start_point = curr.start;
                            end_point = extractionStart; // set new range to the beginning of this
field and ending at the start of the extraction
                            fields_contained = [{name:curr.name,value:curr.value}]; //start a
new fields_contained array with only this current field
                        }
                                    ⋮

*(Cont. from FIG. 10A)*

⋮

```
        } else { // current field ends before the extraction
            if (curr.start < end_point){ // current field is inside previous range
                if (curr.end < end_point){ // field is completely inside the current
range
                    // add to fields contained
                    fields_contained.push({name:curr.name,value:curr.value}); //
add it to the array of fields contained within the overall chunk we're building
                } else { // field goes past the end of the current range
                    end_point = curr.end;
                    fields_contained.push({name:curr.name,value:curr.value}); //
add it to the array of fields contained within the overall chunk we're building
                }
            } else { // current field is past the previous range
                wrappers.push({start:start_point, end:end_point,
fields:fields_contained}); // push previous range
                start_point = curr.start;
                end_point = curr.end; // make the current field the new range
                fields_contained = [{name:curr.name,value:curr.value}]; //start a
new fields_contained array with only this current field
            }

}
    } else { // current field starts after extraction
        if ( start_point == end_point ){ // we must have been in an extraction and
moved our range to the very end
            start_point = curr.start;
            end_point = curr.end; // set the range to be the current field
            fields_contained.push({name:curr.name,value:curr.value}); // add it
to the array of fields contained within the overall chunk we're building
```

*(Cont. from FIG. 10B)*

⋮

```
            } else {
                if (curr.start < end_point){ // this field begins before the end of the
range
                    if(curr.end > end_point){ //field extends beyond range
                        end_point = curr.end; //make current field endpoint the new end
of range
                    }
                    fields_contained.push({name:curr.name,value:curr.value}); // add
it to the array of fields contained within the overall chunk we're building
                } else { // this field starts after the last range
                    wrappers.push({start:start_point, end:end_point,
fields:fields_contained}); // push previous range
                    start_point = curr.start;
                    end_point = curr.end; // make the current field the new range
                    fields_contained = [{name:curr.name,value:curr.value}]; //start a
new fields_contained array with only this current field
                }
            }
        }
    }
} //end for
```

FIG. 10C

… # REAL TIME INDICATION OF PREVIOUSLY EXTRACTED DATA FIELDS FOR REGULAR EXPRESSIONS

TECHNICAL FIELD

The present invention relates generally to data presentation management, and more particularly, but not exclusively, to providing real time display of event records with an indication of fields defined by previously provided extraction rules.

BACKGROUND

The rapid increase in the production and collection of machine-generated data has created large data sets that are difficult to search and/or otherwise analyze. The machine data can include sequences of time stamped records that may occur in one or more usually continuous streams. Further, machine data often represents activity made up of discrete records or events.

Often, search engines may receive data from various data sources, including machine data. In some cases, this data may be analyzed or processed in a variety of ways. However, prior to such processing field values may need to be extracted from the received data. Sometimes the received data may be unstructured, which may make it difficult for systems to efficiently analyze the received data to determine what data may be of interest and/or how to generate a field value extraction rule. This may be especially true where the datasets are considered extremely large, such as terabytes or greater. Such large unstructured datasets may make it difficult and time consuming to analyze the data so as to be able to perform various actions on the data. For example, determining extraction rules, modification rules, or the like on such large datasets that are correct and effective may be difficult and time consuming. Improper and/or ineffective rules may result in improper value from the received data and/or omit significant values. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIGS. 8A-8C illustrate non-exhaustive examples of a use case of embodiments of a graphical user interface that may be employed to enable a user to create extraction rules and to display indications of previously extracted data fields;

FIGS. 9A-9B illustrate non-exhaustive examples of a use case of embodiments of a graphical user interface, such as depicted in FIGS. 8A-8C, to display extraction rules and/or fields associated with a selected portion of event data; and FIGS. 10A-10C illustrate a non-exhaustive example of a code fragment for determining a part of an event record to emphasize based on a plurality of fields.

DETAILED DESCRIPTION

Figure 1:
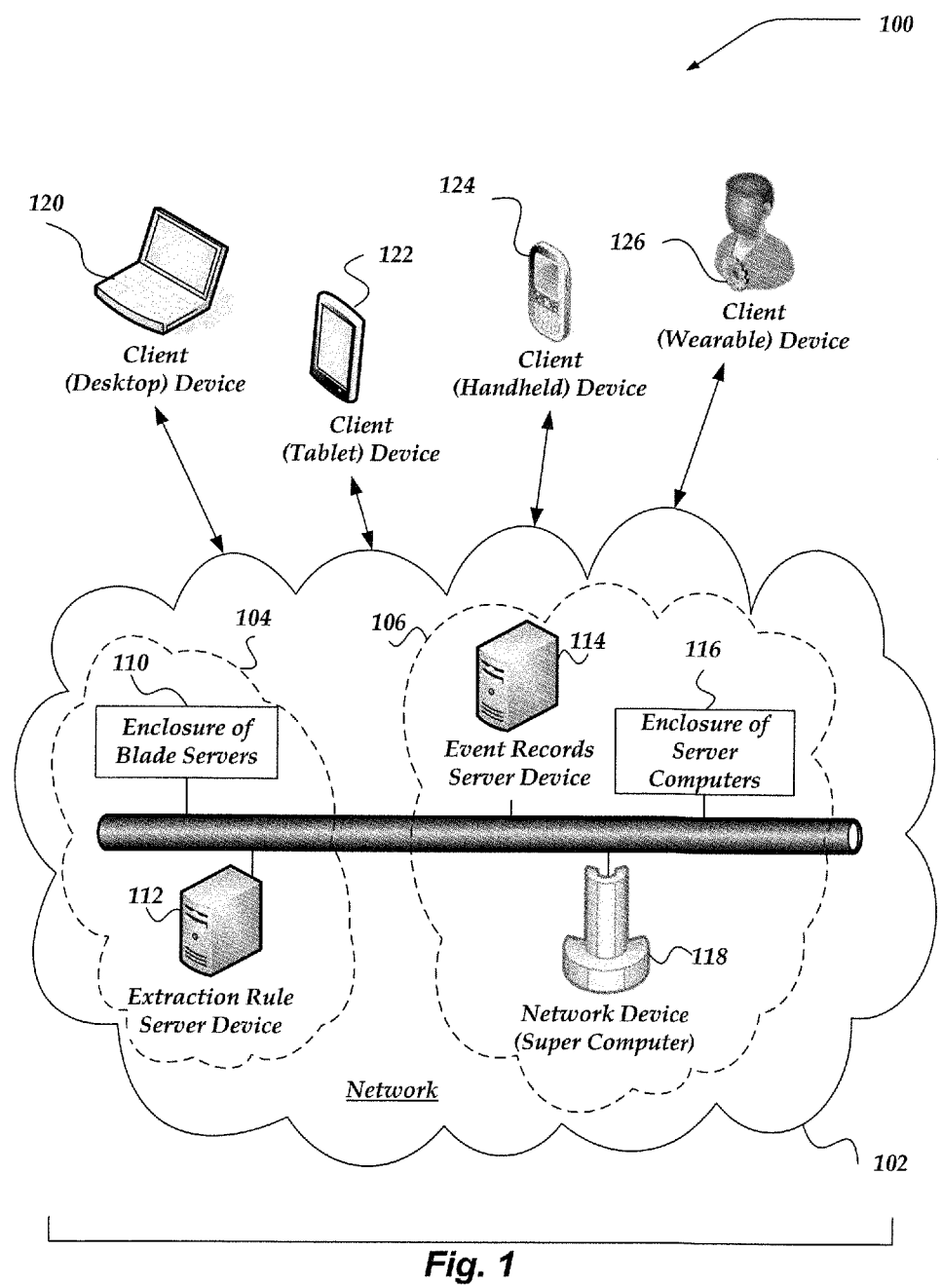
FIG. 1 illustrates a system environment in which various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include data generated by machines, including, but not limited to, server logs or other types of event data and/or event records. In at least one of various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second. In some embodiments, the machine data may be unstructured data, structured data, and/or a combination thereof. Unstructured data may refer to data that does not include at least one predefined field.

As used herein, the term "event record" may refer to computing data that is collected about an event for a computing system, including, for example, an action, characteristic, condition (or state) of the computing system. For example, such events may be about a computing system's performance, actions taken by the computing system, or the like. Event records may be obtained from various computing log files generated by the computer's operating system, and/or other monitoring application. However, event records are not restricted by a file format or structure from which the event data is obtained. In various embodiments, event records may include structured and/or unstructured machine data, and/or any combination thereof.

The term "extraction rule" and/or "data field extraction rule" may refer to instructions that may be applied to identify and extract field values from data, such as event records. In some embodiments, extraction rule may define a field within event records from which to extract a value. In at least one of various embodiments, the extraction rules may include regular expressions. The data from which extraction rules may be applied may include structured and/or unstructured machine data, or other type of data.

The term "regular expression" as used herein may refer to a sequence of constants and operators arranged into expressions for matching a set of strings. A regular expression is often defined as a pattern matching language which can be employed to identify character strings, for example, to select specific strings from a set of character strings. More particularly, regular expressions are often defined as a context-independent syntax that can represent a wide variety of character sets and character set orderings. In operation, regular expressions can be employed to search data based upon a predefined pattern or set of patterns. As such, this pattern matching language employs a specific syntax by which particular characters or strings are selected from a body of text. Although simple examples of regular expressions can be easily understood, oftentimes, the syntax of regular expressions are so complex that even the most experienced programmers have difficulty in understanding them. Regular expressions may be constructed using a variety of computer languages and constructs. In addition to matching, some regular expression systems offer functionality, such as, substitution, grouping, back references, or the like. Regular expressions and regular expression systems may be adapted to work with non-string data providing matching facilities for binary data.

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards real time display of event records with an indication of previously provided extraction rules. In at least one of various embodiments, a plurality of extraction rules may be provided to the system. In at least one embodiment, a user interface may be employed to enable a user to have an extraction rule automatically generated and/or to manually enter an extraction rule. In at least one embodiment, the extraction rules may include regular expressions. A plurality of event records may be displayed to the user, such that text in a field defined by at least one of the extraction rules is emphasized in a display of the event record. In at least one of various embodiments, emphasizing the display of text in the field may include one or more updates to the displayed text, such as dimming, highlighting, underlining, bolding, striking through, italicizing, displaying different font, displaying different font size, displaying different color, displaying different transparency, including parenthesis around the text, and the like. In some embodiments, the same emphasis may be provided for text in overlapping fields, and in other embodiments it may be at least somewhat different for text in overlapping fields.

The user interface may also be employed to enable the user to select at least a portion of text in at least one of the event records. Once selected, the interface may display each extraction rule associated with the selected portion. In some embodiments, the user may roll-over or click on an emphasized part of the event record to select text in an event record, which may display each extraction rule associated with the selected text of the event record.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include extraction rule server device 112, event records server device 114, enclosure of blade servers 110, enclosure of server computers 116, super computer network device 118, and the like. Although not shown, one or more client devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., $2^{nd}$ (2G), $3^{rd}$ (3G), $4^{th}$ (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, and the like.

One embodiment of extraction rule server device 112 is described in more detail below in conjunction with FIG. 4. Briefly, however, extraction rule server device 112 includes virtually any network device capable of generating and/or managing extraction rules. In some embodiments, extraction rule server device 112 may automatically generate extraction rules. Devices that may be arranged to operate as extraction rule server device 112 include various network devices, including, but not limited to personal computers, desktop computers, multiprocessor systems, microprocessor-based or programmable consumer electronics, network PCs, server devices, network appliances, and the like.

Although FIG. 1 illustrates extraction rule server device 112 as a single computing device, the invention is not so limited. For example, one or more functions of the extraction rule server device 112 may be distributed across one or more distinct network devices. Moreover, extraction rule server device 112 is not limited to a particular configuration. Thus, in one embodiment, extraction rule server device 112 may contain a plurality of network devices. In another embodiment, extraction rule server device 112 may contain a plurality of network devices that operate using a master/slave approach, where one of the plurality of network devices of extraction rule server device 112 operates to manage and/or otherwise coordinate operations of the other network devices. In other embodiments, the extraction rule server device 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of event records server device 114 is described in more detail below in conjunction with FIG. 4. Briefly, however, event records server device 114 includes virtually any network device capable of collecting and/or maintaining event records. In some embodiments, event records server device 114 may be in communication with extraction rule server device 112 to enable the use of extraction rules on event records. Devices that may be arranged to operate as event records server device 114 include various network devices, including, but not limited to personal computers, desktop computers, multiprocessor systems, microprocessor-based or programmable consumer electronics, network PCs, server devices, network appliances, and the like.

Although FIG. 1 illustrates event records server device 114 as a single computing device, the invention is not so limited. For example, one or more functions of the event records server device 114 may be distributed across one or more distinct network devices. Moreover, event records server device 114 is not limited to a particular configuration. Thus, in one embodiment, event records server device 114 may contain a plurality of network devices. In another embodiment, event records server device 114 may contain a plurality of network devices that operate using a master/slave approach, where one of the plurality of network devices of event records server device 114 operates to manage and/or otherwise coordinate operations of the other network devices. In other embodiments, the event records server device 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Enclosure of Blade Servers

Figure 2A:
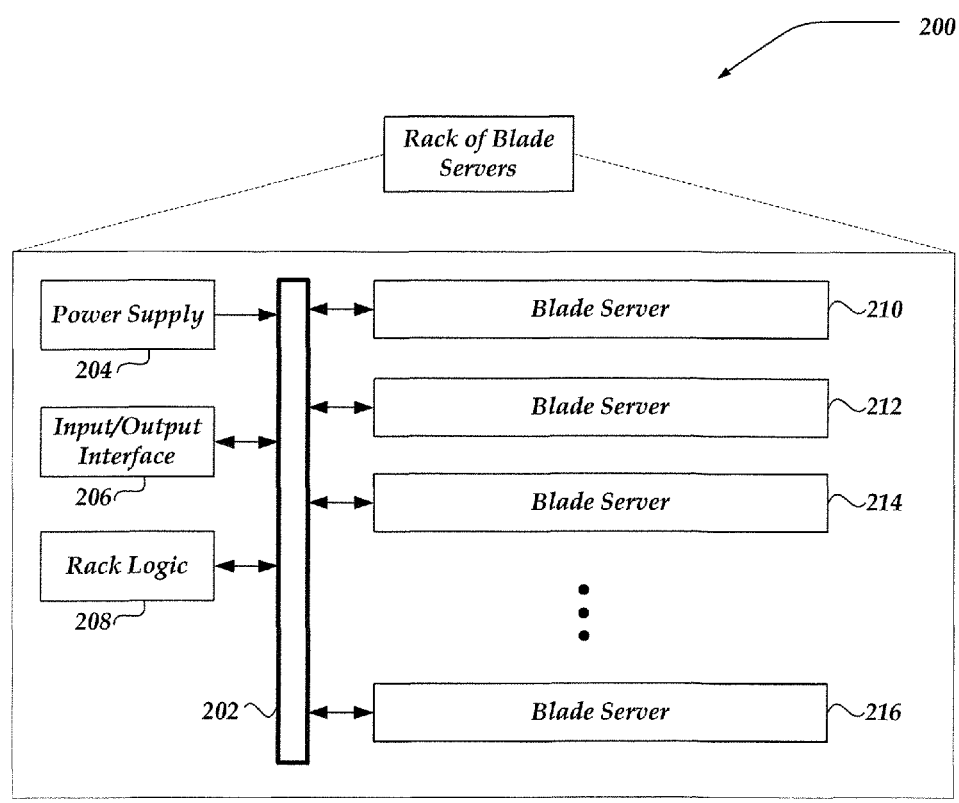
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
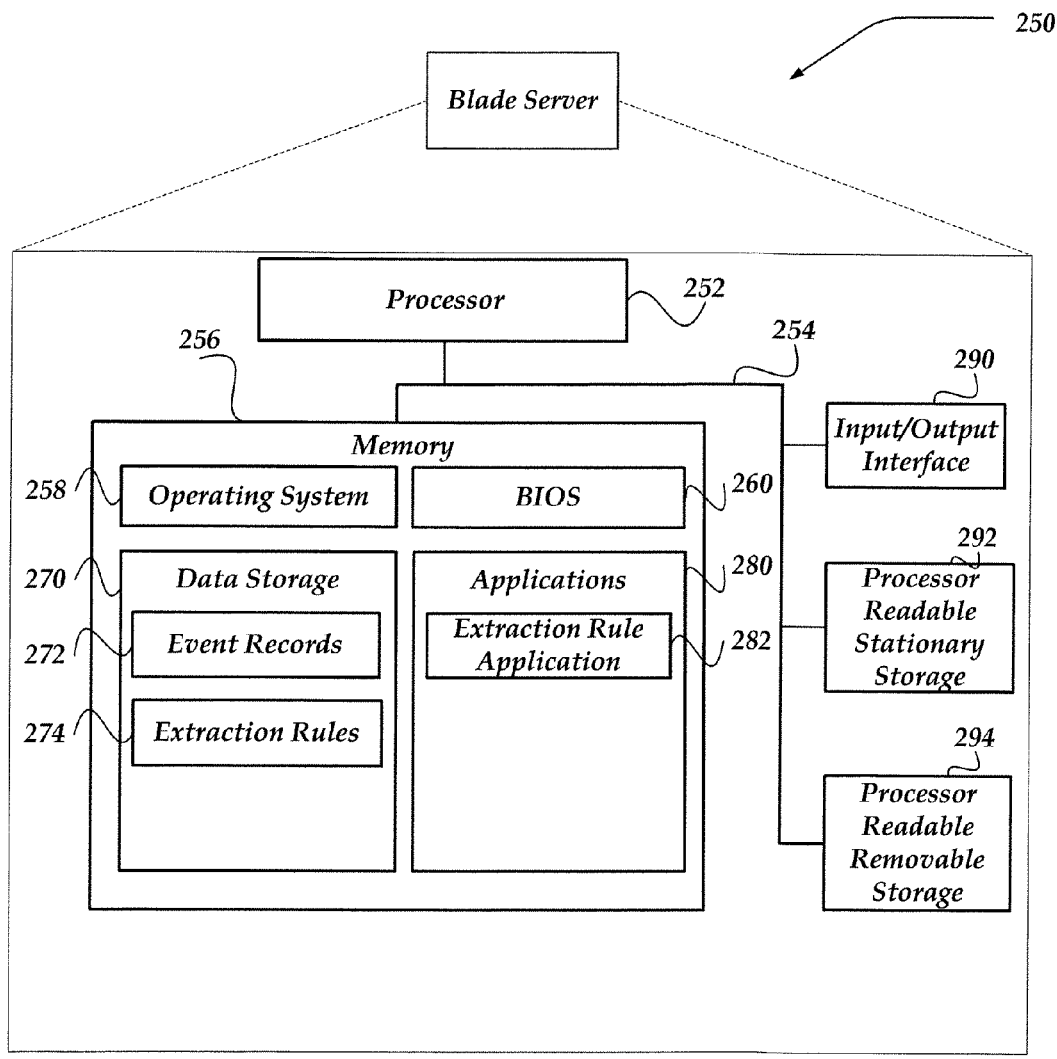
FIG. 2B illustrates an embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 may include processor 252 which communicates with memory 256 via bus 254. Blade server 250 may also include input/output interface 290, processor-readable stationary storage device 292, and processor-readable removable storage device 294. Input/output interface 290 can enable blade server 250 to communicate with other blade servers, client devices, network devices, and the like. Interface 290 may provide wireless and/or wired communication links for blade server. Processor-readable stationary storage device 292 may include devices such as an electromagnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUX™, or a specialized server operating system such as Microsoft's Windows Server™ and Apple Computer's iOS Server™.

Memory 256 may further include one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, event records 272 and extraction rules 274.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, extraction rule application 282.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
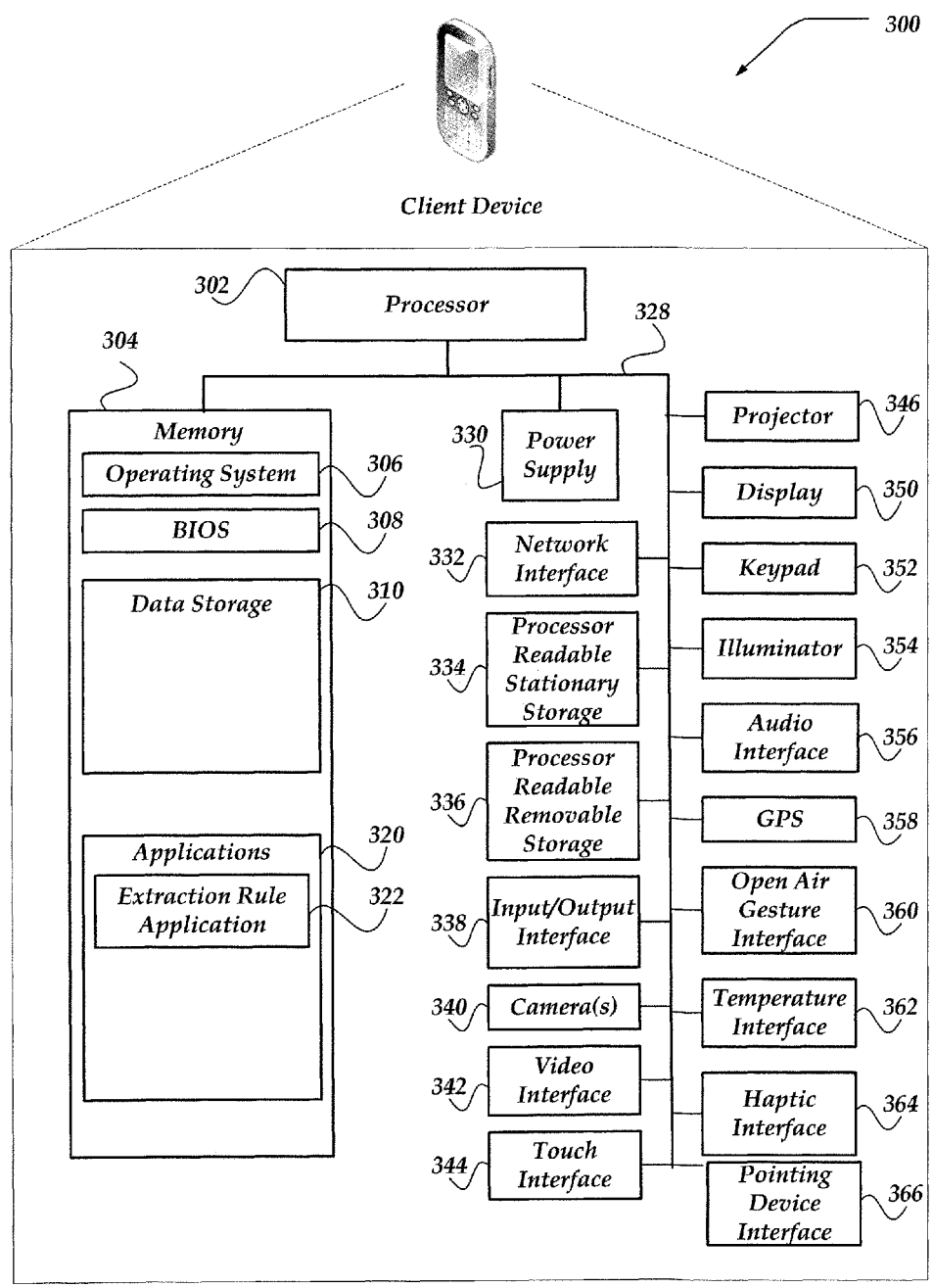
FIG. 3 shows a client device that may be included in various embodiments.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAT), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by client device 300, transmit, receive, and/or otherwise process instructions and data. Applications 320 may include, for example, extraction rule application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Extraction rule application 322 may be configured to enable creation of extraction rules and to display results of the extraction rules to a user. In at least one embodiment, extraction rule application 322 may interact with and/or employed through a web browser. In at least one of various embodiments, extraction rule application 322 may be configured to enable a user to select an emphasized (e.g., dimmed, highlighted, or the like) area within an event record and display each extraction rule, or field defined by an extraction rule, associated with the emphasized area. In some embodiments, extraction rule application 322 may enable a user to input and/or edit one or more extraction rules. In other embodiments, extraction rule application 322 may display a plurality of event records to a user, values extracted from the event records using the extraction rule, statistics about the extracted values, or the like. In any event, extraction rule application 322 may employ processes, or parts of processes, similar to those described in conjunction with FIGS. 5-7, to perform at least some of its actions.

Illustrative Network Device

Figure 4:
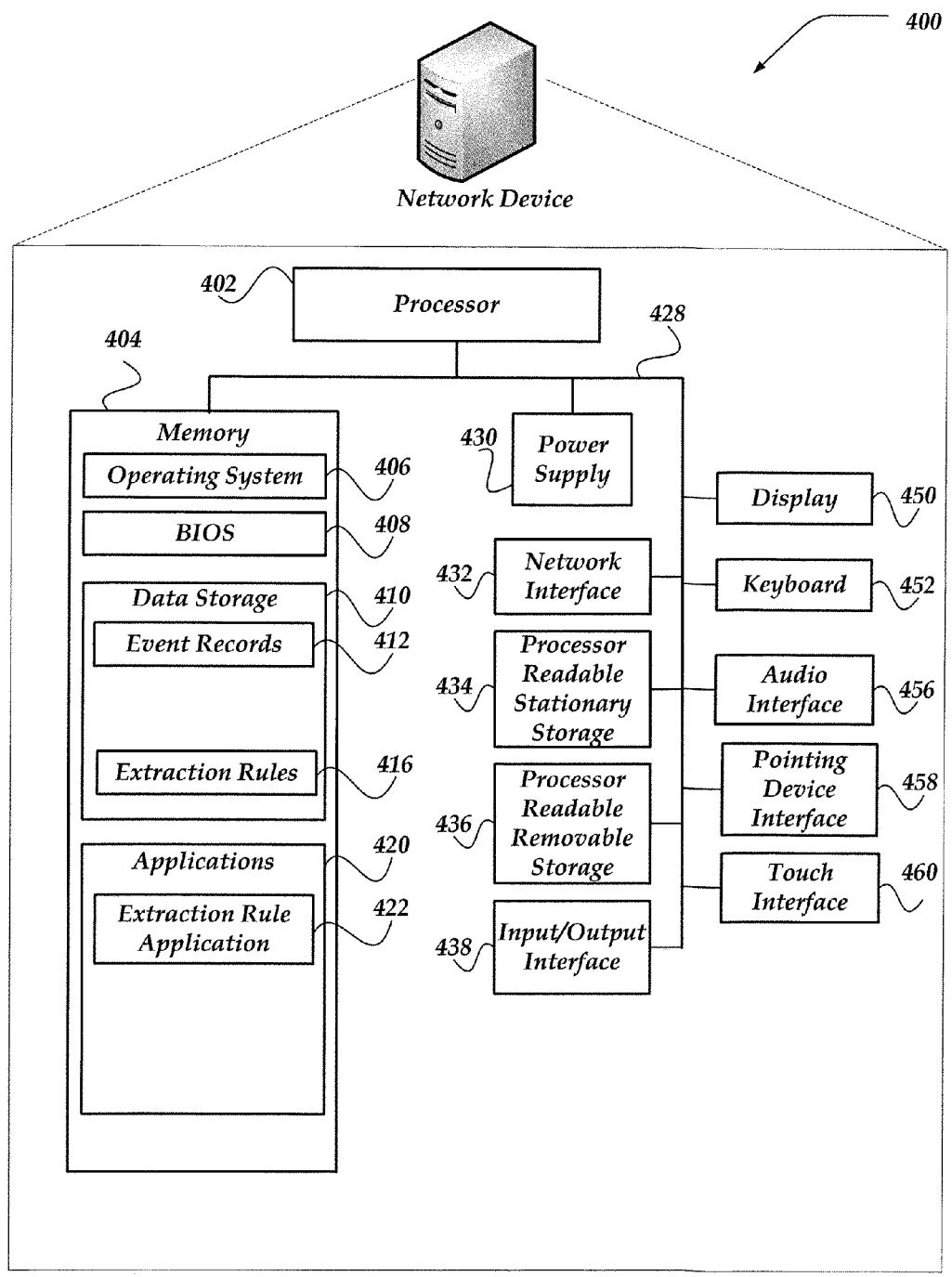
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 may include a processor 402 in communication with a memory 404 via a bus 428. Network device 400 may also include a power supply 430, network interface 432, audio interface 456, display 450, keyboard 452, input/output interface 438, processor-readable stationary storage device 434, processor-readable removable storage device 436, and pointing device interface 458. Power supply 430 provides power to network device 400.

Network interface 432 may include circuitry for coupling network device 400 to one or more networks, and is constructed for use with one or more communication protocols and technologies including, but not limited to, protocols and technologies that implement any portion of the Open Systems Interconnection model (OSI model), GSM, CDMA, time division multiple access (TDMA), UDP, TCP/IP, SMS, MMS, GPRS, WAP, UWB, WiMax, SIP/RTP, or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components can include any component that allows the computer to take input from, or send output to, a human user of a computer.

Memory 404 may include RAM, ROM, and/or other types of memory. Memory 404 illustrates an example of computer-readable storage media (devices) for storage of information such as computer-readable instructions, data structures, program modules or other data. Memory 404 may store BIOS 408 for controlling low-level operation of network device 400. The memory may also store operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400.

Data storage 410 may include, for example, event records 412 and extraction rules 416. In some embodiments, event records 412 may store data, including a plurality of event records. In at least one of various embodiments, event records 412 may be stored by event records server device 114 of FIG. 1. Extraction rules 416 may include one or more extractions rules. These extraction rules may be automatically created based on a user selection of text, input by a user, and/or otherwise provided to the system. In at least one embodiment, extraction rules 416 may be stored and/or otherwise processed by extraction rule server device 112 of FIG. 1.

Applications 420 may include computer executable instructions which, when executed by network device 400, transmit, receive, and/or otherwise process messages (e.g., SMS, MMS, Instant Message (IM), email, and/or other messages), audio, video, and enable telecommunication with another user of another client device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, extraction rule application 422.

Extraction rule application 422 may be configured to enable creation of extraction rules and to display results of the extraction rules to a user. In at least one embodiment, extraction rule application 422 may interact with a client device for enabling a user to input and/or edit one or more extraction rules. In at least one of various embodiments, extraction rule application 322 may be configured to enable a user to select an emphasized (e.g., dimmed, highlighted, or the like) area within an event record and display each extraction rule, or field defined by an extraction rule, associated with the emphasized area. In other embodiments, extraction rule application 422 may enable a client device to display a plurality of event records to a user, values extracted from the event records using the extraction rule, statistics about the extracted values, or the like. In at least one embodiment, extraction rule application 422 may interact with event records 412 and/or extraction rules 416 to access and/or store event records and/or extraction rules, respectively. In some embodiments, extraction rule application 422 may be employed by extraction rule server device 112 of FIG. 1. In any event, extraction rule application 422 may employ processes, or parts of processes, similar to those described in conjunction with FIGS. 5-7, to perform at least some of its actions.

General Operation

Figure 5:
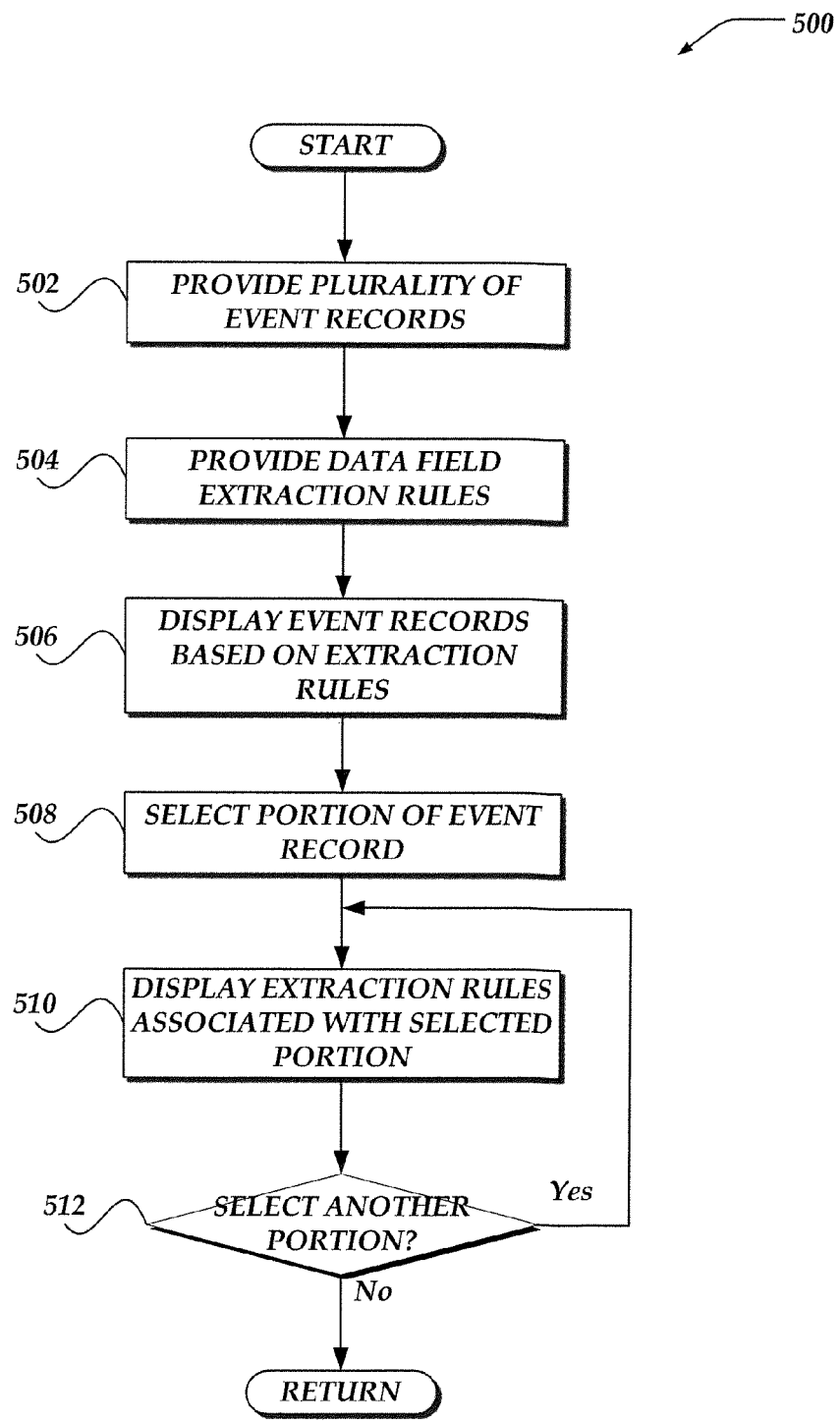
FIG. 5 illustrates a logical flow diagram generally showing one embodiment of an overview process for enabling real time display of fields based on previously provided extraction rules.

The operation of certain aspects of the invention will now be described with respect to FIGS. 5-7. FIG. 5 illustrates a logical flow diagram generally showing one embodiment of an overview process for enabling real time display of fields based on previously provided extraction rules. In some embodiments, process 500 of FIG. 5 may be implemented by and/or executed on a single network device, such as network device 400 of FIG. 4. In other embodiments, process 500 or portions of process 500 of FIG. 5 may be implemented by and/or executed on a plurality of network devices, such as network device 400 of FIG. 4. In yet other embodiments, process 500 or portions of process 500 of FIG. 5 may be implemented by and/or executed on one or more blade servers, such as blade server 250 of FIG. 2B. However, embodiments are not so limited and various combinations of network devices, blade servers, or the like may be utilized.

Process 500 begins, after a start block, at block 502, where a plurality of event records may be provided. In some embodiments, the event records may be provided by a plurality of different computing devices, such as client devices. In at least one embodiment, the plurality of event records may be a sample subset of a larger dataset of event records dataset. In some embodiments, the larger dataset of event records may be associated with one or more users and/or clients. As described above, the event records may be structured data or unstructured data. Additionally, the event records may include machine data.

Process 500 proceeds next to block 504, where data field extraction rules may be provided. In some embodiments, a plurality of extraction rules may be provided. The provided extraction rules may define a field within the plurality of event records from which to extract data (e.g., a field value). Accordingly, in some embodiments, the extraction rule may define a field within the event records independent of a predetermined and/or predefined structure of the event records. Extraction rules may be provided independent of one another. In at least one of various embodiments, two or more extraction rules may define fields that may be distinct and/or separate fields. In other embodiments, two or more extraction rules may define fields that partially or completely overlap each other.

In some embodiments, where fields overlap, an extraction rule may define a subfield of another field. In at least one embodiment, the other field may be defined by another extraction rule and/or may be a structured and/or predefined field. For example, Extraction Rule A may define a field as "Server_ID", which may include a name of a server and an address of the server. Additionally, Extraction Rule B may define a field as "Server_name", which may include the name of the server, but not the address of the server. In this example, Extraction Rule B may define a subfield of the field defined by Extraction Rule A; or Extraction Rule B may be referred to as a sub-rule to Extraction Rule A.

In various embodiments, one or more extraction rules may be provided. Extraction rules may be automatically generated, manually entered by a user, previously provided/created, provided by another system, or the like, or any combination thereof. In at least one embodiment, automatic generation of an extraction rule may be based on a value selected from an event record. In some embodiments, a graphical user interface (GUI) may be employed to enable a user to select desired text of an event record. From the selected text, pattern recognition algorithms may be employed to automatically generate the extraction rule. In at least one embodiment, the extraction rule may be a regular expression.

In another embodiment, the GUI may be employed to enable the user to manually input the extraction rule. In at least one embodiment, the user may enter a regular expression or other extraction rule into an editable input text box in the GUI to define a field within the event records from which to extract data.

In yet other embodiments, the user may utilize the GUI to manually edit extraction rules (either previously automatically generated extraction rules or previous user-entered extraction rules) and receive a real time display of newly extracted values, statistics that correspond to the extracted values, changes to a display of the event records, or the like or any combination thereof. Real time display of field values based on manual editing of extraction rules is described in more detail below in conjunction with FIG. 6.

In some embodiments, the GUI may be employed to enable a user to provide a field name for the extraction rule (e.g., the field defined by the extraction rule). In other embodiments, the system may automatically determine a field name for the extraction rule. In at least one such embodiment, the system may employ the extraction rule to extract a value from one or more event records. The field name may be determined based on this value, such as, for example, a datatype of the extracted value (e.g., an integer), a format of the extracted value (e.g., a phone number, URL, time/date format), or the like. In various embodiments, the extraction rule may be automatically generated, manually input by a user, or the like, or any combination thereof.

In any event, process 500 continues next at block 506, where the GUI may be employed to display the event records based on the provided extraction rules in real time. In at least one embodiment, the plurality of event records may be displayed to the user in virtually any order, such as, most recent, latest, or the like.

An embodiment of a process for displaying event records based on previously provided extraction rules is described in more detail below in conjunction with FIG. 6. Briefly, however, in at least one embodiment, displaying an event record based on an extraction rule may include emphasizing the fields defined by the extraction rules (e.g., the extracted value) in the event record. examples of such emphasizing may include, but are not limited to, dimming, highlighting, underlining, bolding, striking through, italicizing, displaying different font, displaying different font size, displaying different color, displaying different transparency, including parenthesis around the text, and the like. FIGS. 8B and 8C illustrate embodiments of real time display of event records where values associated with one or more fields defined by one or more extraction rules are emphasized.

In some other embodiments, fields defined by different extraction rules may be emphasized in a same way or different ways. For example, in one embodiment, text of each defined field may be emphasized by displaying the text in a single font color. However, such emphasizing may make it difficult for a user to distinguish between fields or to determine if multiple fields overlap. In some other embodiments, each field may be emphasized differently. For example, in one embodiment, text of one defined field may be emphasized by displaying the text in one font, and text of a different defined field may be emphasized by displaying this text in a different font. However, embodiments are not so limited and other types of display emphasizing may be employed.

In some embodiments, real time display of the event records may include displaying the event records based on the provided extraction rules as the extraction rules are being provided, entered, and/or edited by a user. Accordingly, the GUI may update a display of each event record and an indication of each extracted value in near real time as an extraction rule is edited/generated. It should be understood that real time or near real time display of data, as used herein, may include a delay created by some processing of the data, such as, but not limited to, a time to obtain an extraction rule, a time to determine text to emphasize based on the extraction rules, or the like.

Process 500 proceeds next at block 508, where a portion of at least one event record may be selected. The portion of the event record may include a subset, part, and/or area of a displayed event record. For example, in at least one of various embodiments, the portion may be a string of one or more characters, numbers, letters, symbols, white spaces, or the like. However, the selected portion is not limited to a subset of the displayed event record, but in another embodiment, the portion may include the entire displayed event record. In some other embodiments, the portion may span multiple event records.

In some embodiments, the portion may include one or more fields defined by one or more extraction rules. In at least one such embodiment, the portion may be an emphasized area of the event record, such as fields that are emphasized in each event record (e.g., as described at block 506). For example, text of an event record may be emphasized because that text is associated with at least one field defined by at least one extraction rule. In this example, the portion selected by the user may be the emphasized text. FIG. 8C illustrates an embodiment of emphasized portions of an event record based on previously provided extraction rules.

In at least one of various embodiments, a GUI may be employed to enable a user to select the portion of the event record. The user may select the portion of the event record by clicking on the portion of the event record, highlighting text of an event record, rolling over or mousing-over an area of the event record, or the like. For example, in at least one embodiment, a user may click on an emphasized portion of an event record to select it. In another embodiment, the user may roll a pointer over the emphasized portion of the event record to select it. In yet other embodiments, the user may utilize a text selection mechanism to highlight and select text of the event record to be the selected portion of the event record. These embodiments are non-limiting and non-exhaustive and other mechanisms may be employed to enable a user to select a portion of at least one event record. FIGS. 9A-9B illustrate embodiments of a GUI being employed to enable a user to select a portion (e.g., emphasized fields) of an event record.

Process 500 continues at block 510, where extraction rules associated with the selected portion may be displayed, which is described in more detail below in conjunction with FIG. 7. Briefly, however, in at least one of various embodiments, a window or pop-up box may open to display the associated extraction rules. In some embodiments, a name of the associated extraction rules may be displayed. In at least one such embodiment, this name may be a name of the field defined by the extraction rule. In other embodiments, a value of each field defined by the extraction rule may be displayed. In at least one such embodiment, these values may be values extracted from the event record (from which the portion was selected to determine the associated extraction rules) using the associated extraction rules.

In any event, process 500 proceeds to decision block 514, where a determination may be made whether another portion of an event record is selected. In at least one embodiment, a user may select another portion of a same or different event record. Embodiments of block 508 may be employed to receive a selection of another portion of an event record. If another portion is selected, then process 500 may loop to block 510 to display extraction rules associated with the other selected portion; otherwise, process 500 may return to a calling process to perform other actions.

Figure 6:
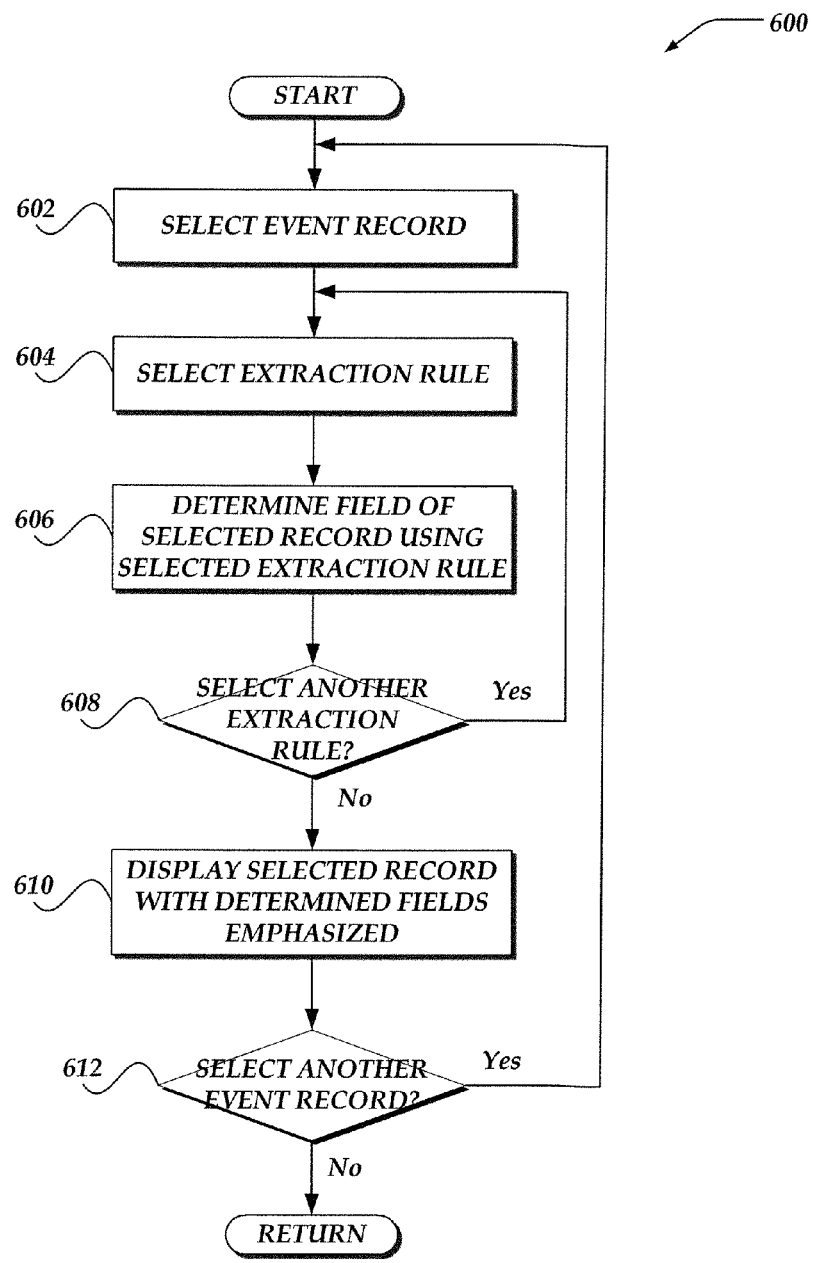
FIG. 6 illustrates a logical flow diagram generally showing one embodiment of a process for displaying event records that emphasizes fields based on previously provided extraction rules.

FIG. 6 illustrates a logical flow diagram generally showing one embodiment of a process for displaying event records that emphasizes fields based on previously provided extraction rules. In some embodiments, process 600 of FIG. 6 may be implemented by and/or executed on a single network device, such as network device 400 of FIG. 4. In other embodiments, process 600 or portions of process 600 of FIG. 6 may be implemented by and/or executed on a plurality of network devices, such as network device 400 of FIG. 4. In yet other embodiments, process 600 or portions of process 600 of FIG. 6 may be implemented by and/or executed on one or more blade servers, such as blade server 250 of FIG. 2B. However, embodiments are not so limited and various combinations of network devices, blade servers, or the like may be utilized.

Some markup languages, such as HTML or XML, do not allow overlapping tag pairs. This type of limitation can make it difficult to display individual fields that overlap one another, where each field may be defined by a tag pair that may overlap another tag pair. Process 600 describes embodiments for displaying overlapping and/or sub-containing sections of text (e.g., overlapping fields and/or sub-fields) within an overlapping tag-pair-limited mark-up language, such as, but not limited to HTML or XML. Process 600 further describes embodiments that enable the display of overlapping fields while preserving individual information segments (e.g., field values) contained within each field or tag pair.

Process 600 begins, after a start block, at block 602, where an event record may be selected. In at least one embodiment, event records may be randomly selected from a plurality of event records (e.g., the plurality of event records provided at block 502 of FIG. 5). In another embodiment, event records may be selected in a predetermined order, such as chronologically (e.g., based on a timestamp), reverse chronologically, alphabetically, or the like. In yet other embodiments, a field, such as a field defined by an extraction rule, may be utilized to determine an order of selecting event records. For example, a field may define a server identifier and event records may be selected based on the server identifier. However, other mechanisms and/or algorithms may be employed for determining which event record to select.

Process 600 proceeds at block 604, where an extraction rule may be selected. In at least one embodiment, the extraction rule may be selected from a plurality of extraction rules that were previously provided (e.g., created, stored, or the like). The plurality of extraction rules may have been automatically generated, manually created, or the like, such as is described at block 504 of FIG. 5.

Process 600 continues at block 606, where a field defined by the selected extraction rule may be determined. In at least one embodiment, this determination may include using the selected extraction rule to determine and/or identify text and/or a value of the selected event record that corresponds to the field defined by the selected extraction rule. In some embodiments, this text and/or value (or a location and size of this text/value within the selected event record) may be at least temporarily maintained/stored and used to display the selected event record at block 610.

In any event, process 600 proceeds to decision block 608, where a determination may be made whether another extraction rule may be selected. In some embodiments, another extraction rule may be selected from a plurality of extraction rules until each of the plurality of extraction rules is selected. If another extraction rule may be selected, then process 600 may loop to block 604 to select another extraction rule; otherwise, process 600 may flow to block 610.

At block 610, the selected event record may be displayed with an emphasis of each determined field (e.g., as determined at block 606). As described above, in at least one embodiment, a display of text of each determined field may be emphasized within the selected event record. In some embodiments, each determined field may be emphasized in the same way, such as, for example, all may be emphasized with a light blue highlight. In other embodiments, each determined field may be emphasized in a different way, such as, for example, each determined field may be enclosed in different colored parentheses. However, embodiments are not so limited, and other mechanisms for emphasizing the determined fields in the selected event record may be employed.

In some embodiments, two or more determined fields may overlap. In at least one such embodiment, the corresponding text/values may be combined and emphasized together as a super set field, such that each overlapping field may not be individually distinguished from one another. Accordingly, in some embodiments, the combined text may be employed to emphasize a plurality of fields in a super set field that is defined by a plurality of different extraction rules.

In at least one embodiment, a start and end character location of the determined fields within the selected event record may be utilized to determine if fields overlap. For example, assume in the selected event record, Field_A has a start character location of 5 and an end character location of 10 and Field_B has a start character location of 7 and an end character location of 15. In this example, a combined text from character location 5 to 15 may be emphasized.

In some other embodiments, the start and end character location of multiple determined fields may be compared to determine a super set or most inclusive field. For example, assume the above example is expanded to include Field_C that has a start character location of 5 and an end character location of 22. In this expanded example, the combined text that may be emphasized may be from character location 5 to 22. Additionally, in this expanded example, Field_A and Field_B may be sub-fields of Field_C (and may or may not be sub-fields of each other). One example of a code fragment for determining a super set field that contains continuous fields is illustrated in FIGS. 10A-10C. This code fragment also stores sub-field information for display on rollover (such as may be utilized at blocks 708, 710, and/or 712 of FIG. 7).

In any event, process 600 continues next at decision block 612, where a determination may be made whether another event record may be selected. In some embodiments, another event record may be selected from a plurality of event records until each of the plurality of event records is selected and displayed. If another event record may be selected, then process 600 may loop to block 602 to select another event record; otherwise, process 600 may return to a calling process to perform other actions.

Figure 7:
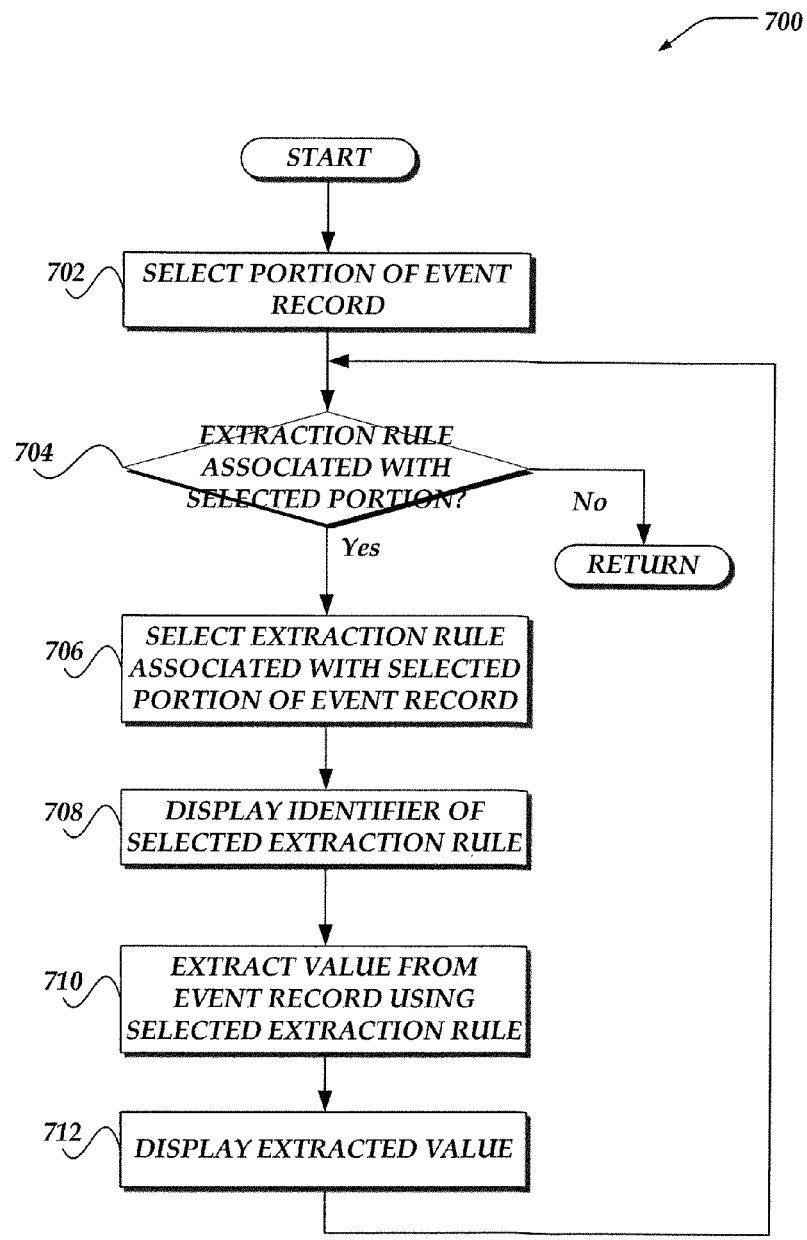
FIG. 7 illustrates a logical flow diagram generally showing one embodiment of a process for displaying previously provided extraction rules associated with a selected portion of an event record.

FIG. 7 illustrates a logical flow diagram generally showing one embodiment of a process for displaying previously provided extraction rules associated with a selected portion of an event record. In some embodiments, process 700 of FIG. 7 may be implemented by and/or executed on a single network device, such as network device 400 of FIG. 4. In other embodiments, process 700 or portions of process 700 of FIG. 7 may be implemented by and/or executed on a plurality of network devices, such as network device 400 of FIG. 4. In yet other embodiments, process 700 or portions of process 700 of FIG. 7 may be implemented by and/or executed on one or more blade servers, such as blade server 250 of FIG. 2B. However, embodiments are not so limited and various combinations of network devices, blade servers, or the like may be utilized.

Process 700 begins, after a start block, at block 702, where a portion of an event record may be selected. In at least one of various embodiments, block 702 may employ embodiments of block 508 to select a portion of an event record.

Process 700 proceeds to decision block 704, where a determination may be made whether there is one or more extraction rules associated with the selected portion that was not previously selected at block 706. In some embodiments, process 700 may proceed through blocks 706, 708, 710, and 712 once for each extraction rule associated with the selected portion. If one or more extraction rules are associated with the selected portion, then process 700 may flow to block 706; otherwise, process 700 may return to a calling process to perform other actions.

At block 706, an extraction rule associated with selected portion may be selected. In at least one embodiment, the selection of an extraction rule may be random, in a predetermined order, or the like.

Process 708 proceeds next to block 708, where an identifier of the selected extraction rule may be displayed. In some embodiments, this identifier may include a name of the field defined by the selected extraction rule. In other embodiments, this identifier may be an extraction rule name. In yet other embodiments, the selected extraction rule itself may be displayed.

Process 700 continues at block 710, where the selected extraction rule may be used to extract a value from the event record from which the selected portion was selected. In at least one of various embodiments, the selected extraction rule may be applied to the event records to determine data to extract from the event record. The extracted data from the event record may be the particular value for the event record for the field defined by the selected extraction rule. For example, if the selected extraction rule defines a field as the characters between a first set of single brackets, then the value for the event record "Dec 17 10:35:38 ronnie nslcd[23629]: [40f750] passwd entry uid" may be "23629".

In any event, process 700 proceeds at block 712, where the extracted value may be displayed. In at least one embodiment, the extracted value may be displayed next to or in conjunction with the identifier of the selected extraction rule. An example of a GUI displaying an identifier of the selected extraction rule and a corresponding extracted value is illustrated in FIGS. 9A-9B.

After block 712, process 700 may loop to decision block 704 to determine if there may be another extraction rule associated with the selected portion that was not previously selected at block 706.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustration

FIGS. 8A-8C illustrate non-exhaustive examples of use case of embodiments of a graphical user interface that may be employed to enable a user to create extraction rules and to display indications of previously extracted data fields.

FIG. 8A illustrates a non-exhaustive example of a use case of an embodiment of graphical user interface that may be employed to enable a user to create extraction rules. Graphical user interface (GUI) 800A may include multiple viewing windows and/or sections that each display information to a user. For example, GUI 800A may include records 808, input 802, input 806, extraction rule preview 804, records 808, and extracted values 810.

Records 808 may display each event record that is determined based on inputs 802 and 806. Input 802 may enable a user to input a data source (e.g., a specific database) and/or a data type (e.g., system log data). As illustrated, input 802 may include one or more pull down menus of available options of the data sources and/or data types available. However, other menus, lists, windows, or interfaces may also be employed. Input 806 may enable the user to define a specific filter to apply the event records (e.g., the user may filter the event records to display those event records that were recorded on a particular day). In other embodiments, input 806 may enable a user to select how the event records are selected for display. In at least one embodiment, event records 808 may include a subset and/or sampling of a lager data set. For example, input 806 may be used to select that event records 808 includes a predetermined number (e.g., 100) of the latest event records. However, other result types may be used, such as oldest, most popular, least popular, or the like, or any combination thereof.

Extraction rule preview 804 may display instructions to a user for creating an extraction rule. For example, the user may highlight and/or select text in an event record in records 808 to have an extraction rule automatically created. In another example, the user may manually enter an extraction rule (e.g., by clicking on the "Create extraction rule" button, an editable text box may open or become visible where the user can manually input an extraction rule). Extraction rule preview 804 may display the extraction rule after it is created, such as is shown in FIG. 8B. Additionally, the user may be enabled to save the extraction rule for additional processing of event records and extracted values.

Extracted values 810 may show unique values that are extracted from event records 808 based on an extraction rule provided by extraction rule preview 804. As illustrated, extracted values 810 may be empty because no extraction rule has been provided.

FIG. 8B illustrates a non-exhaustive example of a use case of an embodiment of a graphical user interface where an extraction rule has been provided. GUI 800B may be an embodiment of GUI 800A from FIG. 8A.

Extraction rule preview 804 may display the provided extraction rule. In at least one embodiment, GUI 800B may include editable text box 814 to enable the user to provide a field name of the field defined by the extraction rule. As described above, the extraction rule may have been automatically generated based on user selected text from an event record in the event records 808. In other embodiments, a user may have manually entered the extraction rule. As illustrated, the extraction rule may be displayed in editable text box 812. Editable text box 812 may enable a user to manually edit the extraction rule. As the user is manually editing the extraction rule, records 808 may be automatically and dynamically updated in real time to show new values extracted from each event record in records 808. For example, the extracted values from each event record may be emphasized, as shown by emphasis 824. Additionally, extracted values 810 may be automatically and dynamically updated in real time as the user edits the extraction rule.

In other embodiments, the extraction rule may be manipulated by indicating an incorrect extracted value (e.g., a counter-example). In at least one embodiment, a counter-example may be a value extracted from an event record based on an extraction rule that does not match a desired field of the user. For example, assume an extraction rule is created to define a field for a server name. However, assume the extraction rule extracts other data from at least one of the event records. The user may indicate this other data as a counter-example, and the system may automatically re-generate the extraction rule taking this counter-example into account. In at least one of various embodiments, a user may indicate a counter-example by clicking on a counter-example button, such as button 822. By clicking button 822, the system may automatically re-generate the extraction rule based on the counter example and the other extracted values.

Extracted values 810 may include one or more unique values extracted from records 808 based on the extraction rule. In at least one embodiment, statistics that correspond to each unique extracted value may be displayed. For example, data 816 shows a percentage of the number of times each particular unique value is extracted from records 808. As illustrated, each of these percentages may also be illustrated as a percentage bar (e.g., percentage bar 818) for each unique extracted value.

FIG. 8C illustrates a non-exhaustive example of a use case of an embodiment of graphical user interface that may be employed to display event records with an emphasis of fields defined by previously provided extraction rules. GUI 800C may be an embodiment of GUI 800A of FIG. 8A.

GUI 800C may include input 826. Input 826 may be a check box or other mechanism that may be selected by a user. In at least one embodiment, a selection of input 826 may display records 808 with emphasized fields defined by previous extraction rules. As illustrated, each event record in records 808 may include one or more emphasized sections of text, such as sections 828 and 830. In some embodiments, an emphasized section, such as section 830, may include a plurality of at least partially overlapping fields. As shown, these overlapping fields may not be distinguished from one another. However, in other embodiments (not shown), these overlapping fields may be distinguished from one another using different types of emphasis.

FIGS. 9A-9B illustrate non-exhaustive examples of a use case of embodiments of a graphical user interface, such as depicted in FIGS. 8A-8C, to display extraction rules and/or fields associated with a selected portion of an event record.

GUI 900A may be an embodiment of GUI 800C. As illustrated, a user may move a cursor or other pointer over section 904 to select section 904. By selecting section 904, GUI 900A may display extraction rules associated with that portion of event record 920. In at least one embodiment, section 904 may be an embodiment of section 828 of FIG. 8C. By employing embodiments described above, a box 906 may pop-up and/or open to display an extraction rule that is associated with section 904 of event record 920. In this example, box 906 may include a fieldname of a field defined by the associated extraction rule ("Server ID") and a value extracted from event record 920 using the associated extraction rule ("23629"). In this illustration section 904 may be associated with a single extraction rule.

GUI 900B may be an embodiment of GUI 900A. As illustrated, a user may move a cursor or other pointer over section 910 to select section 910. By selecting section 910, GUI 900B may display extraction rules associated with that portion of event record 920. In at least one embodiment, section 910 may be an embodiment of section 830 of FIG. 8C. By employing embodiments described above, box 912 may pop-up and/or open to display extraction rules that are associated with section 910 of event record 920. In some embodiments, box 912 may be an embodiment of box 906 of FIG. 9A. In this example, box 912 may include a fieldname of a field defined by each associated extraction rule and corresponding value extracted from event record 920 using the associated extraction rules. In this example illustration, section 910 may have three different extraction rules associated with it, and an identifier of each extraction rule may be displayed in box 912 (e.g., "Error", "Error type", and "User ID"). Additionally, each associated extraction rule may be used to extract a corresponding value from event record 920, which may also be displayed in box 912.

Moreover, some fields may be sub-fields of other fields. In this example, fieldnames "Error type" and "User ID" may be sub-fields of fieldname "Error" because fieldname "Error" overlaps both fieldname "Error type" and "User ID".

FIGS. 10A-10C illustrate a non-exhaustive example of a code fragment for determining a part of an event record to emphasize based on a plurality of fields.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A computer-implemented method, comprising:
receiving raw data on a computing device;
dividing the raw data into a set of time stamped searchable events;
storing the set of events in an indexed data store;
applying an extraction rule to the set of events, wherein an extraction rule defines a field within an event from which to extract a value;
extracting a value from a field within an event, wherein the value is extracted using the extraction rule; and
displaying the event in a graphical interface, wherein the value extracted from the field within the event is emphasized.

2. The method of claim 1, wherein the set of events includes unstructured machine data.

3. The method of claim 1, wherein the extraction rule includes a regular expression.

4. The method of claim 1, wherein the extraction rule includes a regular expression automatically generated to extract a value selected from an event.

5. The method of claim 1, further comprising:
receiving input corresponding to a selection of the emphasized value from the displayed event; and
displaying one or more extraction rules that extract the selected emphasized value from the event when applied to the event.

6. The method of claim 1, further comprising:
receiving input corresponding to a selection of the emphasized value from the displayed event, wherein the selected emphasized value is included within a plurality of fields defined by a plurality of extraction rules, and wherein the plurality of fields at least partially overlap each other; and displaying one or more of the plurality of extraction rules.

7. The method of claim 1, further comprising:
receiving input corresponding to a selection of the emphasized value from the displayed event; and
displaying two or more extraction rules that are associated with the selected emphasized value.

8. The method of claim 1, further comprising:
extracting an additional value from the displayed event using an additional extraction rule; and
emphasizing the additional value differently than the displayed emphasized value.

9. The method of claim 1, further comprising:
extracting an additional value in an additional filed defined by an additional extraction rule; and
determining that the field and the additional field overlap.

10. The method of claim 1, further comprising:
extracting an additional value in an additional filed defined by an additional extraction rule;
determining that the field and the additional field overlap;
receiving input corresponding to a hovering or a selection over an overlapping portion of the value and the additional value; and
concurrently displaying the value and the additional value.

11. A system, comprising:
a processor; and
a non-transitory computer-readable storage medium containing instructions configured to cause the processor to perform operations including:
receiving raw data on a computing device;
dividing the raw data into a set of time stamped searchable events;
storing the set of events in an indexed data store;
applying an extraction rule to the set of events, wherein an extraction rule defines a field within an event from which to extract a value;
extracting a value from a field within an event, wherein the value is extracted using the extraction rule; and
displaying the event in a graphical interface, wherein the value extracted from the field within the event is emphasized.

12. The system of claim 11, wherein the set of events includes unstructured machine data.

13. The system of claim 11, wherein the extraction rule includes a regular expression.

14. The system of claim 11, wherein the extraction rule includes a regular expression automatically generated to extract a value selected from an event.

15. The system of claim 11, further comprising instructions configured to cause the processor to perform operations including:
receiving input corresponding to a selection of the emphasized value from the displayed event; and
displaying one or more extraction rules that extract the selected emphasized value from the event when applied to the event.

16. The system of claim 11, further comprising instructions configured to cause the processor to perform operations including:
receiving input corresponding to a selection of the emphasized value from the displayed event, wherein the selected emphasized value is included within a plurality of fields defined by a plurality of extraction rules, and wherein the plurality of fields at least partially overlap each other; and
displaying one or more of the plurality of extraction rules.

17. The system of claim 11, further comprising instructions configured to cause the processor to perform operations including:
receiving input corresponding to a selection of the emphasized value from the displayed event; and
displaying two or more extraction rules that are associated with the selected emphasized value.

18. The system of claim 11, further comprising instructions configured to cause the processor to perform operations including:
extracting an additional value from the displayed event using an additional extraction rule; and
emphasizing the additional value differently than the displayed emphasized value.

19. The system of claim 11, further comprising instructions configured to cause the processor to perform operations including:
extracting an additional value in an additional filed defined by an additional extraction rule; and
determining that the field and the additional field overlap.

20. The system of claim 11, further comprising instructions configured to cause the processor to perform operations including:
extracting an additional value in an additional filed defined by an additional extraction rule;
determining that the field and the additional field overlap;
receiving input corresponding to a hovering or a selection over an overlapping portion of the value and the additional value; and
concurrently displaying the value and the additional value.

21. A computer-program product, tangibly embodied in a non-transitory machine-readable medium, including instructions configured to cause a data processing apparatus to:
receive raw data on a computing device;
divide the raw data into a set of time stamped searchable events;
store the set of events in an indexed data store;
apply an extraction rule to the set of events, wherein an extraction rule defines a field within an event from which to extract a value;
extract a value from a field within an event, wherein the value is extracted using the extraction rule; and
display the event in a graphical interface, wherein the value extracted from the field within the event is emphasized.

22. The computer-program product of claim 21, wherein the set of events includes unstructured machine data.

23. The computer-program product of claim 21, wherein the extraction rule includes a regular expression.

24. The computer-program product of claim 21, wherein the extraction rule includes a regular expression automatically generated to extract a value selected from an event.

25. The computer-program product of claim 21, further including instructions configured to cause the data processing apparatus to:
receive input corresponding to a selection of the emphasized value from the displayed event; and
display one or more extraction rules that extract the selected emphasized value from the event when applied to the event.

26. The computer-program product of claim 21, further including instructions configured to cause the data processing apparatus to:

receive input corresponding to a selection of the emphasized value from the displayed event, wherein the selected emphasized value is included within a plurality of fields defined by a plurality of extraction rules, and wherein the plurality of fields at least partially overlap each other; and display one or more of the plurality of extraction rules.

27. The computer-program product of claim 21, further including instructions configured to cause the data processing apparatus to:

receive input corresponding to a selection of the emphasized value from the displayed event; and display two or more extraction rules that are associated with the selected emphasized value.

28. The computer-program product of claim 21, further including instructions configured to cause the data processing apparatus to:

extract an additional value from the displayed event using an additional extraction rule; and emphasize the additional value differently than the displayed emphasized value.

29. The computer-program product of claim 21, further including instructions configured to cause the data processing apparatus to:

extract an additional value in an additional filed defined by an additional extraction rule; and determine that the field and the additional field overlap.

30. The computer-program product of claim 21, further including instructions configured to cause the data processing apparatus to:

extract an additional value in an additional filed defined by an additional extraction rule;

determine that the field and the additional field overlap;

receive input corresponding to a hovering or a selection over an overlapping portion of the value and the additional value; and concurrently display the value and the additional value.

* * * * *

UNITED STATES PATENT AND TRADEMARK OFFICE
CERTIFICATE OF CORRECTION

PATENT NO.      : 8,751,963 B1
APPLICATION NO. : 13/748391
DATED           : June 10, 2014
INVENTOR(S)     : R. David Carasso, Micah James Delfino and Johnvey Hwang It is certified that error appears in the above-identified patent and that said Letters Patent is hereby corrected as shown below:

In the claims

COLUMN 23
Claim 9: Line 17: Delete "filed" and insert --field--.

COLUMN 23
Claim 10: Line 21: Delete "filed" and insert --field--.

COLUMN 24
Claim 19: Line 23: Delete "filed" and insert --field--.

COLUMN 24
Claim 20: Line 29: Delete "filed" and insert --field--.

COLUMN 26
Claim 29: Line 6: Delete "filed" and insert --field--.

COLUMN 26
Claim 30: Line 12: Delete "filed" and insert --field--.

Signed and Sealed this
Ninth Day of August, 2016

Michelle K. Lee
*Director of the United States Patent and Trademark Office*